July 14, 1925.
C. B. WOODMAN ET AL
1,546,160
BRAKE BAND LINING
Original Filed Feb. 24, 1921
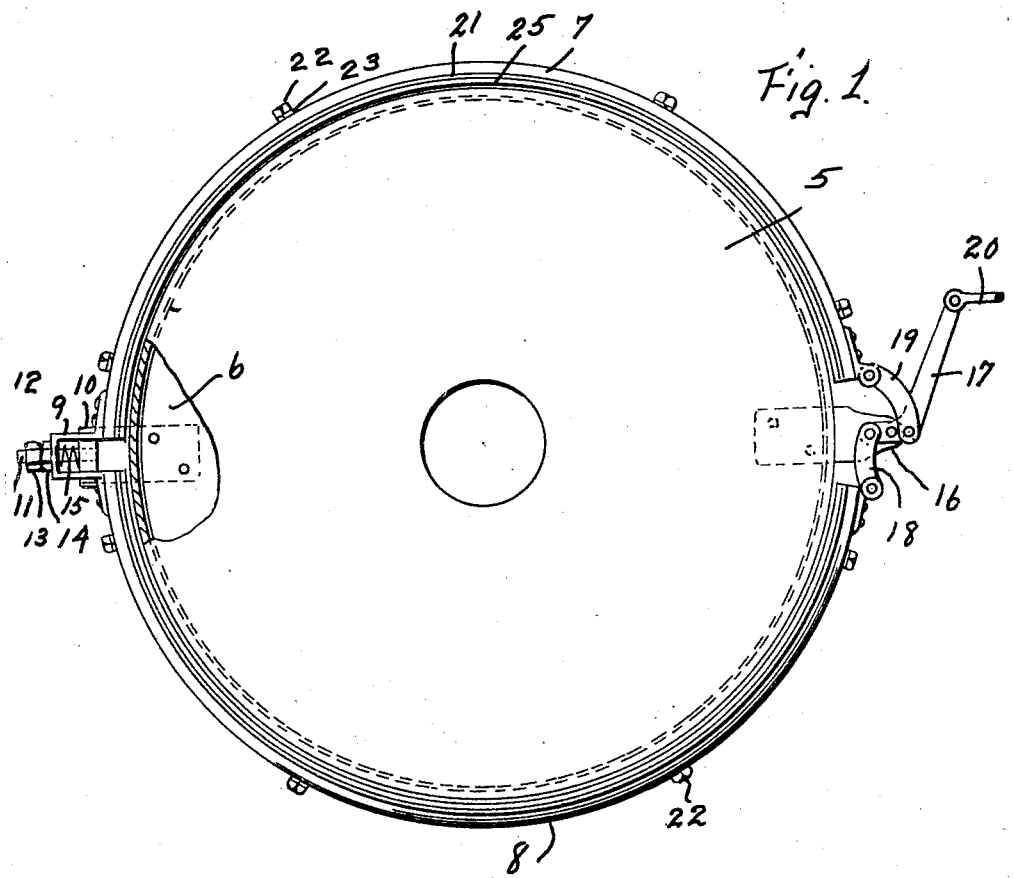
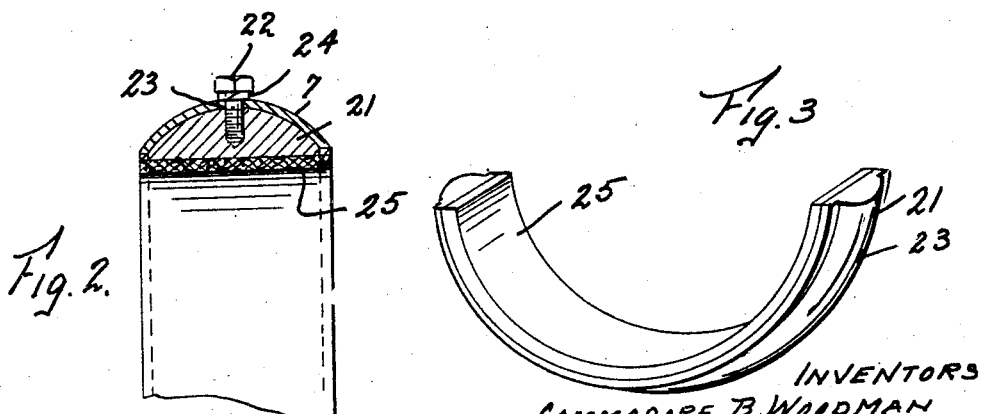
INVENTORS
COMMODORE B. WOODMAN
ROBERT A. WINZLER
by Frank Waterfield
ATTORNEY.

Patented July 14, 1925.

1,546,160

UNITED STATES PATENT OFFICE.

COMMODORE B. WOODMAN AND ROBERT A. WINZLER, OF FRESNO, CALIFORNIA.

BRAKE-BAND LINING.

Application filed February 24, 1921, Serial No. 447,625. Renewed June 15, 1925.

*To all whom it may concern:*

Be it known that we, COMMODORE B. WOODMAN and ROBERT A. WINZLER, citizens of the United States, and residents of Fresno, in the county of Fresno, State of California, have invented certain new and useful Improvements in Brake-Band Linings, of which the following is a specification.

Our invention relates primarily to method and means for relining vehicle brakes. Heretofore in the use of vehicle brakes it has frequently happened that the lining has become worn unevenly and to reline the same it has been necessary to remove the brake band from the vehicle and then remove the lining from the brake band, and, because of the uneven wear of the lining, considerable wastage has been caused by the necessity of replacing the entire lining.

It is the object of our invention to provide method and means for relining vehicle brakes without removing the same from their place of use, and which will be cheap and easily and quickly performed.

Another object is to provide means by which in the event that the lining wears unevenly the sections of lining may be transposed, the section showing the most wear and the section showing the least wear having their positions on the brake band transposed, thereby obviating the necessity of frequent relining.

Another object is to provide means whereby any particular section of the lining may be replaced without disturbing or interfering with the remaining sections.

Other objects and advantages will appear hereinafter and, while we have shown and will describe the preferred form of our invention, we wish it understood that we do not limit ourselves to such preferred form, but that various changes and adaptations may be made therein without departing from the spirit of our invention.

In the drawings accompanying and forming a part hereof:

Fig. 1 is a side elevation of a conventional form of automobile brake showing our device applied thereto.

Fig. 2 is an enlarged transverse section through the brake band and shoe.

Fig. 3 is a perspective view of a section of the brake shoe removed from its place of use.

Referring to the drawings, 5 designates a brake drum of the usual form used on auto vehicles, and 6 the dust shield. Surrounding drum 5 is the brake band, preferably formed of two sections 7 and 8. The rear ends of sections 7 and 8 are connected by a bracket 9 which bracket straddles a lug 10 projecting outwardly from the dust shield 6. Mounted in lug 10 is a stud 11 which projects through an aperture 12 in bracket 9 and has mounted on its free end lock nuts 13 and 14. A coil spring 15 is coiled around stud 11, between lug 10 and bracket 9. Extending forwardly from the opposite end of dust shield 6 is a bracket 16 in the free end of which is pivotally mounted one end of an L-shaped operating lever 17. Pivotally connected to the free end of section 8 of the brake band is a link 18 the other end of which is pivotally connected to the free end of the short leg of member 17, and pivotally connected at one end to the free end of section 7 is a link 19 the other end of which is connected to the short leg of member 17. Member 17 is connected by a rod 20 to the usual brake operating pedal, not shown, whereby when rod 20 is moved forwardly lever 17 will be rocked and through levers 18 and 19 will draw sections 7 and 8 into contact with brake drum 5. As best shown in Fig. 2, brake bands 7 and 8 are arcuate in transverse section and the brake shoes 21 are of a configuration to snugly fit the interior thereof and are held positioned therein by screws 22 which pass through apertures 23 in bands 7 and 8 and are screw-threaded in said shoes 21. Lock washers 24 are provided beneath the heads of screws 22 and bands 7 and 8 to hold screws 22 from accidental displacement. The usual brake lining 25 is secured to the inner face of shoes 21 by rivets or otherwise.

While we have shown and described our device as being provided with two semi-circular brake shoes, we wish it understood that we do not limit ourselves to such number, but that more or less may be used as desired.

In the use of our device, in the event that it becomes necessary to change or reline the brakes, the same will be expanded to their maximum, screws 22 will be removed to release the desired section, when the same may be removed and a new shoe inserted. Screws 22 will again be positioned and the device is ready for use.

Having described our invention, what we claim is:

The combination with a vehicle having a rotatable brake drum, of a relatively stationary brake band extending around said drum, but normally spaced therefrom, said brake band being composed of two half sections mounted on opposite sides of said drum and having their adjacent ends spaced apart; a supporting bracket connecting two adjacent ends of said half sections; a flexible connection between the other ends of said sections adapted to be operated to draw said last ends together to decrease the diameter of said band; said sections being arcuate in transverse cross section and opening inwardly; a brake shoe detachably mounted within each of said half sections and being of a configuration to snugly fit therein and be held against transverse displacement, each of said shoes being provided on their exposed faces with brake lining adapted, when the ends of said sections are drawn together, to engage the outer periphery of said drum and retard the rotation thereof; and means for detachably securing said shoes positioned for use adapted to hold the same against longitudinal movement relative to said shoes; and means to hold said last means against accidental displacement.

In testimony whereof we have signed our names to this specification in the presence of two subscribing witnesses.

COMMODORE B. WOODMAN.
ROBERT A. WINZLER.

Witnesses:
A. B. KERR,
M. C. SMITH.